(12) United States Patent
Sun et al.

(10) Patent No.: US 10,404,517 B1
(45) Date of Patent: *Sep. 3, 2019

(54) ORTHOGONAL FREQUENCY DIVISION MULTIPLEX DATA UNIT GENERATION AND DECODING

(71) Applicant: Marvell International Ltd., Hamilton (BM)

(72) Inventors: Yakun Sun, San Jose, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,591

(22) Filed: Oct. 10, 2018

Related U.S. Application Data

(63) Continuation of application No. 15/186,011, filed on Jun. 17, 2016, now Pat. No. 10,122,563.
(Continued)

(51) Int. Cl.
*H04L 27/26* (2006.01)
*H04L 29/06* (2006.01)
*H04W 84/12* (2009.01)

(52) U.S. Cl.
CPC ........ *H04L 27/266* (2013.01); *H04L 27/2605* (2013.01); *H04L 27/2647* (2013.01); *H04L 69/18* (2013.01); *H04W 84/12* (2013.01)

(58) Field of Classification Search
None
See application file for complete search history.

(56) References Cited

U.S. PATENT DOCUMENTS

| 6,897,792 B1 * | 5/2005 | Feng | H03M 13/27 341/58 |
| 7,158,058 B1 * | 1/2007 | Yu | G11B 20/10 341/58 |

(Continued)

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
(Continued)

*Primary Examiner* — Berhanu Tadese

(57) ABSTRACT

A communication device receives a physical layer (PHY) data unit that includes i) a first orthogonal frequency division multiplexing (OFDM) symbol corresponding to a legacy signal field of a PHY preamble, and ii) a second OFDM symbol that immediately follows the first OFDM symbol. The communication device determines a first bit sequence corresponding to the first OFDM symbol and a second bit sequence corresponding to the second OFDM symbol. The communication device unscrambles the second bit sequence to obtain an unscrambled second bit sequence, and determines whether the unscrambled second bit sequence matches the first bit sequence. If the unscrambled second bit sequence matches the first bit sequence, the communication device decodes the PHY data unit according to a first communication protocol, and if the unscrambled second bit sequence does not match the first bit sequence, decodes the PHY data unit according to a second communication protocol.

20 Claims, 10 Drawing Sheets

Related U.S. Application Data

(60) Provisional application No. 62/181,316, filed on Jun. 18, 2015.

(56) References Cited

U.S. PATENT DOCUMENTS

| | | | | |
|---|---|---|---|---|
| 7,218,255 | B1* | 5/2007 | Feng | H04L 1/0041 341/58 |
| 7,234,097 | B1* | 6/2007 | Feng | G11B 20/1833 714/758 |
| 7,469,049 | B1* | 12/2008 | Feng | H04N 21/2347 380/200 |
| 7,475,331 | B1* | 1/2009 | Feng | H03M 5/04 380/200 |
| 7,756,002 | B2* | 7/2010 | Batra | H04B 1/7163 370/208 |
| 8,009,701 | B2* | 8/2011 | Luo | H04L 27/2613 370/503 |
| 8,155,138 | B2 | 4/2012 | Van Nee | |
| 8,243,774 | B2* | 8/2012 | Khan | H04L 25/03866 375/141 |
| 8,526,351 | B2 | 9/2013 | Fischer et al. | |
| 8,724,720 | B2 | 5/2014 | Srinivasa et al. | |
| 9,025,428 | B2* | 5/2015 | Jones, IV | H04L 5/0046 370/203 |
| 9,131,528 | B2 | 9/2015 | Zhang et al. | |
| 9,166,660 | B2 | 10/2015 | Chu et al. | |
| 9,674,802 | B2* | 6/2017 | Luo | H04L 27/2613 |
| 9,762,357 | B2* | 9/2017 | Maattanen | H04L 1/1671 |
| 9,887,823 | B2* | 2/2018 | Chae | H04L 5/0055 |
| 9,913,263 | B2* | 3/2018 | Park | H04W 72/0413 |
| 10,044,421 | B2* | 8/2018 | Li | H04L 69/22 |
| 10,050,747 | B2* | 8/2018 | Maattanen | H04L 1/1671 |
| 10,122,563 | B1* | 11/2018 | Sun | H04L 27/266 |
| 10,129,060 | B2* | 11/2018 | Jones, IV | H04L 5/0046 |
| 2002/0159422 | A1* | 10/2002 | Li | H04B 1/707 370/342 |
| 2004/0151109 | A1* | 8/2004 | Batra | H04B 1/7163 370/208 |
| 2006/0023802 | A1* | 2/2006 | Balakrishnan | H03M 13/2936 375/265 |
| 2006/0067278 | A1* | 3/2006 | Li | H04B 1/707 370/335 |
| 2007/0206638 | A1* | 9/2007 | Santoru | H04N 21/4382 370/476 |
| 2007/0211619 | A1* | 9/2007 | Jalloul | H04B 1/707 370/209 |
| 2007/0223406 | A1* | 9/2007 | Li | H04B 1/707 370/278 |
| 2008/0159537 | A1* | 7/2008 | Khan | H04L 25/03866 380/268 |
| 2009/0046702 | A1* | 2/2009 | Luo | H04L 27/2613 370/350 |
| 2009/0196163 | A1 | 8/2009 | Du | |
| 2011/0002219 | A1 | 1/2011 | Kim et al. | |
| 2011/0007728 | A1* | 1/2011 | Jading | H04L 1/0072 370/342 |
| 2011/0013690 | A1* | 1/2011 | Kobayashi | H04J 3/1658 375/240 |
| 2011/0032921 | A1* | 2/2011 | Li | H04B 1/707 370/342 |
| 2011/0033051 | A1* | 2/2011 | Steer | H04L 5/0007 380/270 |
| 2011/0255620 | A1* | 10/2011 | Jones, IV | H04L 5/0046 375/260 |
| 2011/0261708 | A1 | 10/2011 | Grandhi | |
| 2011/0305237 | A1* | 12/2011 | Luo | H04L 27/2613 370/350 |
| 2013/0229996 | A1 | 9/2013 | Wang et al. | |
| 2013/0322563 | A1* | 12/2013 | Van Zelst | H04L 27/2621 375/295 |
| 2014/0337690 | A1 | 11/2014 | Zhang | |
| 2015/0117227 | A1 | 4/2015 | Zhang et al. | |
| 2015/0131517 | A1 | 5/2015 | Chu et al. | |
| 2015/0195112 | A1* | 7/2015 | Jones, IV | H04L 5/0046 375/308 |
| 2015/0237178 | A1* | 8/2015 | Zhang | H04L 69/22 370/328 |
| 2016/0037441 | A1* | 2/2016 | Li | H04L 1/0001 370/338 |
| 2016/0056940 | A1* | 2/2016 | Chae | H04L 5/0055 370/312 |
| 2016/0066324 | A1* | 3/2016 | Li | H04L 69/22 370/338 |
| 2016/0105535 | A1* | 4/2016 | Kenney | H04L 69/22 370/329 |
| 2016/0112157 | A1* | 4/2016 | Li | G06F 11/1004 714/807 |
| 2016/0112851 | A1* | 4/2016 | Li | H04L 69/18 370/338 |
| 2016/0156750 | A1 | 6/2016 | Zhang et al. | |
| 2016/0183243 | A1* | 6/2016 | Park | H04W 72/0413 370/329 |
| 2016/0227437 | A1* | 8/2016 | Blanksby | H04L 1/00 |
| 2016/0227532 | A1* | 8/2016 | Azizi | H04L 69/22 |
| 2016/0323424 | A1* | 11/2016 | Merlin | H04L 69/22 |
| 2016/0330300 | A1* | 11/2016 | Josiam | H04L 69/22 |
| 2016/0374020 | A1* | 12/2016 | Azizi | H04W 52/0229 |
| 2017/0041103 | A1* | 2/2017 | Maattanen | H04L 1/1671 |
| 2017/0171766 | A1* | 6/2017 | Amizur | H04W 24/08 |
| 2017/0373808 | A1* | 12/2017 | Park | H04L 5/005 |
| 2018/0006769 | A1* | 1/2018 | Maattanen | H04L 1/1671 |
| 2018/0323910 | A1* | 11/2018 | Maattanen | H04L 1/1671 |

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

(56) References Cited

OTHER PUBLICATIONS

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

Chen, "Home Network Basis: Transmission Environments and Wired/Wireless Protocols," Prentice Hall, pp. 1-26 (Jul. 2003).

Chun et al., "Legacy Support on HEW frame structure," doc: IEEE 11-13/1057r0, *The Institute of Electrical and Electronics Engineers, Inc.*, pp. 1-8 (Sep. 2013).

Hiertz et al., "The IEEE 802.11 Universe," IEEE Communications Magazine, pp. 62-70, (Jan. 2010).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Seok et al., "HEW PPDU Format for Supporting MIMO-OFDMA," IEEE 802.11-14/1210r0, 16 pages, (Sep. 14, 2014).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

\* cited by examiner

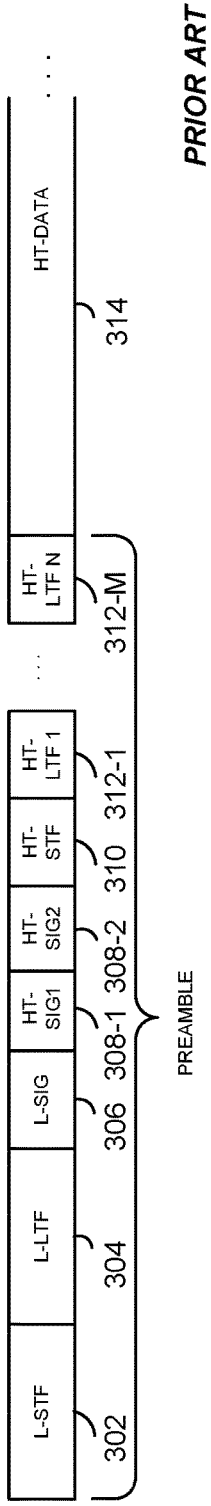
FIG. 3 *PRIOR ART*
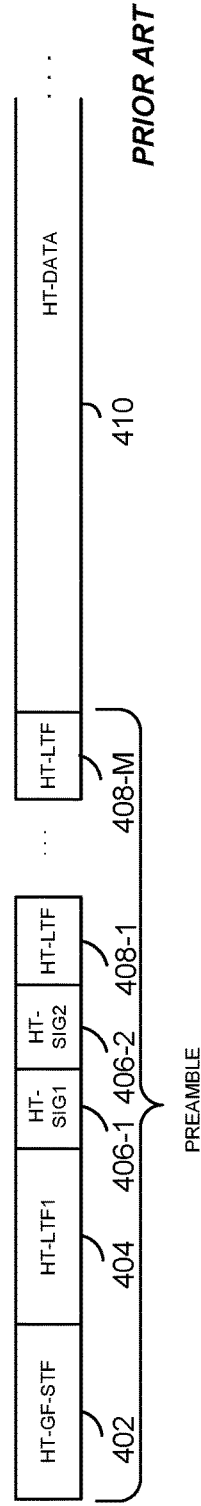
FIG. 4 *PRIOR ART*
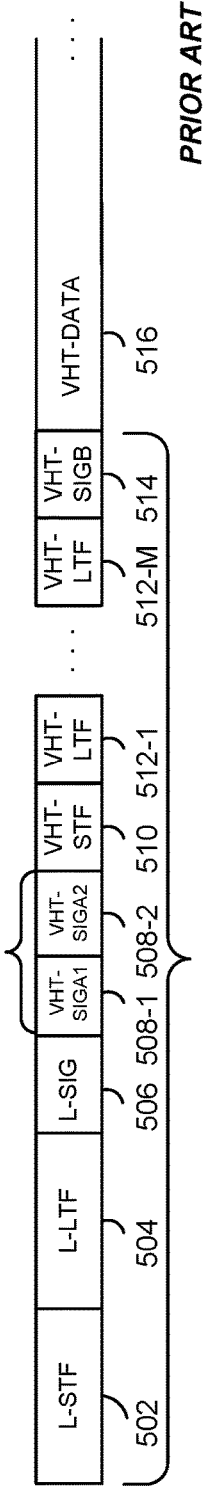
FIG. 5 *PRIOR ART*

ORTHOGONAL FREQUENCY DIVISION MULTIPLEX DATA UNIT GENERATION AND DECODING

CROSS-REFERENCES TO RELATED APPLICATIONS

This application is a continuation of U.S. patent application Ser. No. 15/186,011, entitled "Orthogonal Frequency Division Multiplex Data Unit Generation and Decoding," filed on Jun. 17, 2016, which claims the benefit of U.S. Provisional Patent Application No. 62/181,316, entitled "Scrambling Repeated LSIG for Next Generation of WiFi," filed on Jun. 18, 2015. Both of the applications referenced above are incorporated herein by reference in their entireties.

FIELD OF THE DISCLOSURE

The present disclosure relates generally to communication networks and, more particularly, to wireless local area networks that utilize data unit preambles which indicate a communication protocol.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: receiving, by a communication device, orthogonal frequency division multiplexing (OFDM) symbols of a physical layer (PHY) data unit that includes i) a first OFDM symbol corresponding to a legacy signal field of a PHY preamble of the PHY data unit, and ii) a second OFDM symbol that immediately follows the first OFDM symbol; and determining, by the communication device, whether the second OFDM symbol corresponds to a repetition of the legacy signal field. Determining whether the second OFDM symbol corresponds to a repetition of the legacy signal field includes: determining a first bit sequence corresponding to the first OFDM symbol, determining a second bit sequence corresponding to the second OFDM symbol, performing an unscrambling procedure on the second bit sequence using a scrambling bit sequence that corresponds to a first communication protocol to obtain an unscrambled second bit sequence that corresponds to the second OFDM symbol, and determining whether the unscrambled second bit sequence matches the first bit sequence. The method further includes: in response to a determination that the unscrambled second bit sequence matches the first bit sequence, decoding, by the communication device, at least some of the OFDM symbols of the PHY data unit according to the first communication protocol; and in response to a determination that the unscrambled second bit sequence does not match the first bit sequence, decoding, by the communication device, at least some of the OFDM symbols of the PHY data unit according to a second communication protocol.

In another embodiment, an apparatus comprises: a network interface device having one or more integrated circuits (ICs). The one or more ICs are configured to: receive orthogonal frequency division multiplexing (OFDM) symbols of a physical layer (PHY) data unit that includes i) a first OFDM symbol corresponding to a legacy signal field of a PHY preamble of the PHY data unit, and ii) a second OFDM symbol that immediately follows the first OFDM symbol; and determine whether the second OFDM symbol corresponds to a repetition of the legacy signal field. Determining whether the second OFDM symbol corresponds to a repetition of the legacy signal field includes: determining a first bit sequence corresponding to the first OFDM symbol, determining a second bit sequence corresponding to the second OFDM symbol, performing an unscrambling procedure on the second bit sequence using a scrambling bit sequence that corresponds to a first communication protocol to obtain an unscrambled second bit sequence that corresponds to the second OFDM symbol, and determining whether the unscrambled second bit sequence matches the first bit sequence. The one or more ICs are further configured to: in response to a determination that the unscrambled second bit sequence matches the first bit sequence, decode at least some of the OFDM symbols of the PHY data unit according to the first communication protocol; and in response to a determination that the unscrambled second bit sequence does not match the first bit sequence, decode at least some of the OFDM symbols of the PHY data unit according to a second communication protocol.

In yet another embodiment, a method includes: generating, at a communication device, a physical layer (PHY) data unit that conforms to a first communication protocol. Generating the PHY data unit includes: generating a first orthogonal frequency division multiplexing (OFDM) symbol that corresponds to a legacy signal field of a PHY preamble of the PHY data unit, wherein the legacy signal field includes a signal field bit sequence, and generating a second OFDM symbol that corresponds to a repetition of the legacy signal field to indicate to other communication devices that the PHY data unit conforms to the first communication protocol. Generating the second OFDM symbol includes: scrambling the signal field bit sequence with a scrambling bit sequence to obtain a scrambled bit sequence, and generating the second OFDM symbol based on the scrambled bit sequence. Generating the PHY data unit further includes: generating a third OFDM symbol that corresponds to a non-legacy signal field of the PHY preamble. The method further includes: transmitting, by the communication device, the PHY data unit.

In still another embodiment, an apparatus comprises: a network interface device having one or more integrated circuits (ICs). The one or more ICs are configured to: generate a physical layer (PHY) data unit that conforms to a first communication protocol. Generating the PHY data unit includes: generating a first orthogonal frequency division multiplexing (OFDM) symbol that corresponds to a legacy signal field of a PHY preamble of the PHY data unit, wherein the legacy signal field includes a signal field bit sequence, and generating a second OFDM symbol that corresponds to a repetition of the legacy signal field to indicate to other communication devices that the PHY data unit conforms to the first communication protocol. Generating the second OFDM symbol includes: scrambling the signal field bit sequence with a scrambling bit sequence to obtain a scrambled bit sequence, and generating the second OFDM symbol based on the scrambled bit sequence. Generating the PHY data unit further includes: generating a third OFDM symbol that corresponds to a non-legacy signal field of the PHY preamble. The one or more ICs are further configured to transmit the PHY data unit.

BRIEF DESCRIPTION OF THE DRAWINGS

FIG. 3 is a diagram of another prior art data unit format.
FIG. 4 is a diagram of another prior art data unit format.
FIG. 5 is a diagram of another prior art data unit format.

DETAILED DESCRIPTION

In embodiments described below, a wireless network device such as an access point (AP) or client station (STA) of a wireless local area network (WLAN) generates an orthogonal frequency division multiplex (OFDM) data unit that includes a repeated legacy signal field. In some embodiments and/or scenarios, the repeated legacy signal field indicates that the data unit corresponds to a first communication protocol, for example, an Institute for Electrical and Electronics Engineers (IEEE) 802.11ax protocol. In some scenarios, a potential for "false triggering" of a classification for a received data unit as an IEEE 802.11ax data unit exists when a first data symbol (e.g., a first OFDM symbol of a data portion) of an IEEE 802.11a data unit and a non-legacy signal field of the IEEE 802.11ax protocol are quite "alike" so that an IEEE 801.11a data unit is misidentified as an IEEE 802.11ax data unit. In other words, the received OFDM symbols are similar such that they do not have a suitable Hamming distance to provide accurate decoding in some scenarios. The repeated legacy signal field generally provides for a more reliable auto-detection of the IEEE 802.11ax protocol. In some embodiments, the repeated legacy signal field is also scrambled to reduce false triggering.

In an embodiment, OFDM symbols of an OFDM data unit are received. The OFDM symbols include a first OFDM symbol that corresponds to a legacy signal field followed by a second OFDM symbol that corresponds to a candidate signal field. In an embodiment, it is determined whether the candidate signal field corresponds to a repetition of the legacy signal field. At least some of the OFDM symbols of the OFDM data unit are decoded according to a first communication protocol indicated by the determination of whether the candidate signal field corresponds to the repetition of the legacy signal field, in an embodiment.

Figure 1:
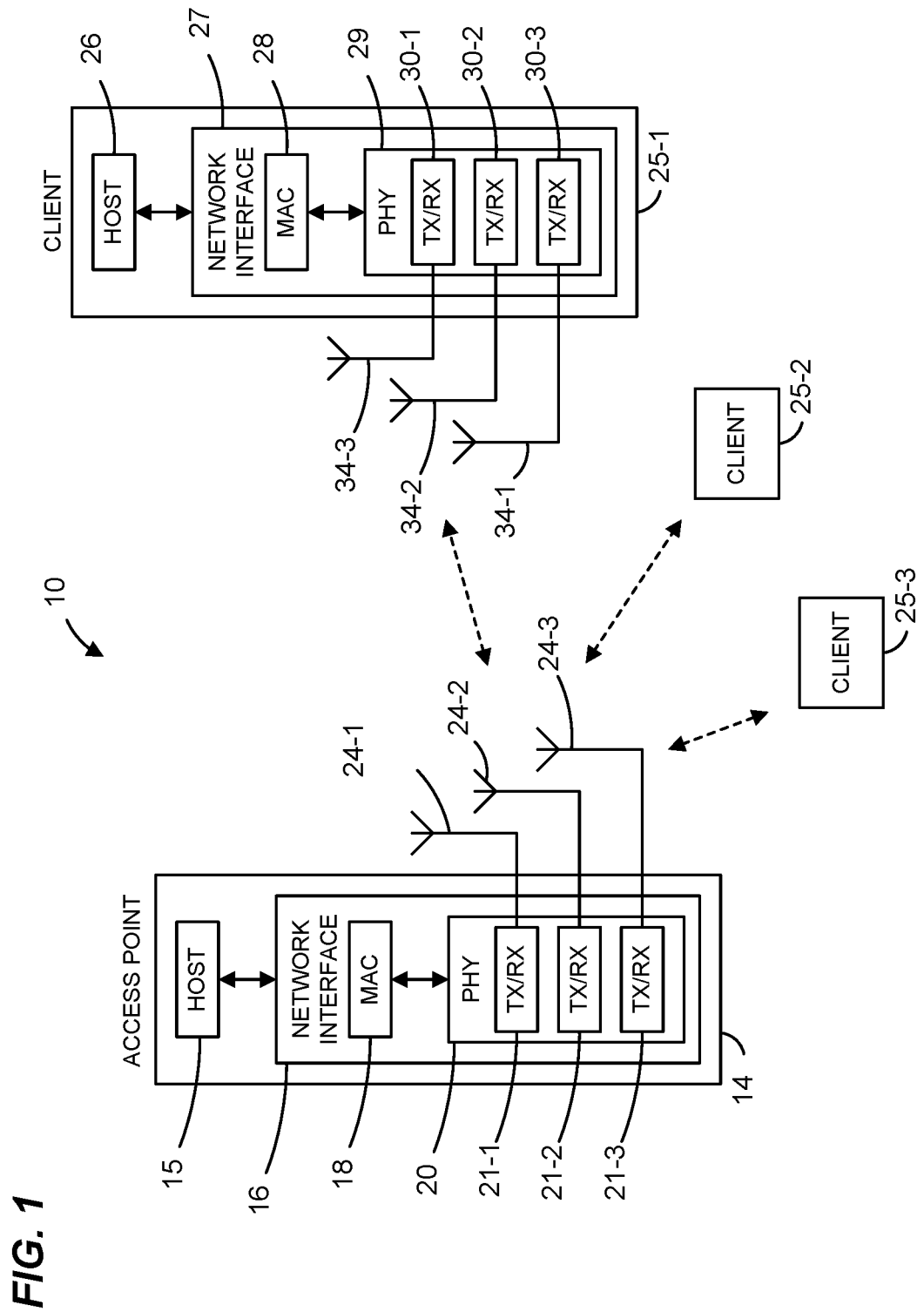
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

In various embodiments, one or both of the AP 14 and the client station 25 are configured to transmit and/or receive OFDM data units that include a repeated legacy signal field. In some embodiments, the AP 14 or client station 25 generates an OFDM data unit that includes a repeated legacy signal field. In other embodiments, the AP 14 or client station generates an OFDM data unit that includes a repeated and scrambled legacy signal field. In an embodiment, the AP 14 or client station 25 selects a scrambling bit sequence for generating the repeated and scrambled legacy signal field.

Figure 2A:
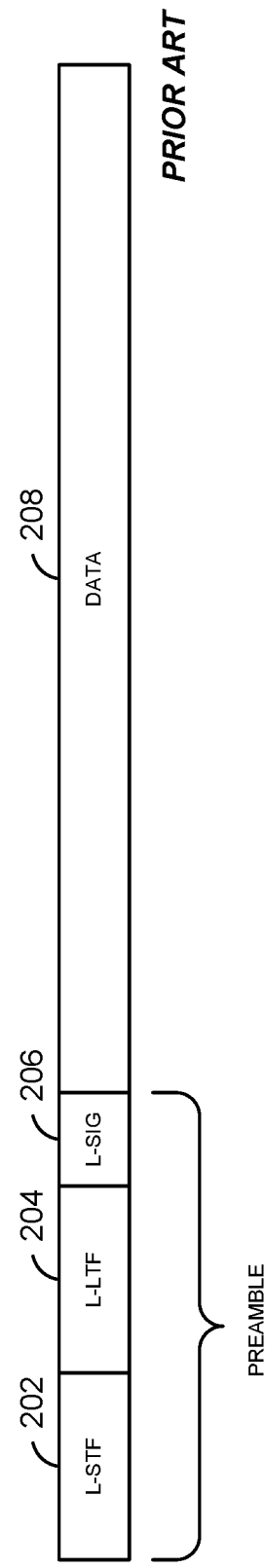
FIGS. 2A and 2B are diagrams of a prior art data unit format.
Figure 2B:
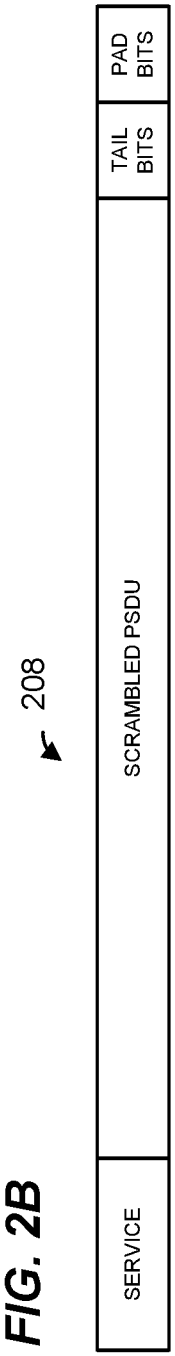

FIG. 2A is a diagram of a prior art orthogonal frequency division multiplexing (OFDM) data unit 200 that the AP 14 is configured to transmit to the legacy client station 25-4 via orthogonal frequency division multiplexing (OFDM) modulation, according to an embodiment. In an embodiment, the legacy client station 25-4 is also configured to transmit the data unit 200 to the AP 14. The data unit 200 conforms to the IEEE 802.11a Standard and occupies a 20 Megahertz (MHz) bandwidth. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

FIG. 3 is a diagram of a prior art OFDM data unit 300 that the AP 14 is configured to transmit to the legacy client station 25-4 via OFDM modulation, according to an embodiment. In an embodiment, the legacy client station 25-4 is also configured to transmit the data unit 300 to the AP 14. The data unit 300 conforms to the IEEE 802.11n Standard, occupies a 20 MHz bandwidth, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally based on the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

FIG. 4 is a diagram of a prior art OFDM data unit 400 that the AP 14 is configured to transmit to the legacy client station 25-4 via OFDM modulation, according to an embodiment. In an embodiment, the legacy client station 25-4 is also configured to transmit the data unit 400 to the AP 14. The data unit 400 conforms to the IEEE 802.11n Standard, occupies a 20 MHz bandwidth, and is designed for "Greenfield" situations, i.e., when the WLAN does not include any client stations that conform to the IEEE 802.11a Standard, and only includes client stations that conform to the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408. The data unit 400 also includes a data portion 410.

FIG. 5 is a diagram of a prior art OFDM data unit 500 that the AP 14 is configured to transmit to the legacy client station 25-4 via OFDM modulation, according to an embodiment. In an embodiment, the legacy client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different suitable bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, and a second very high throughput signal field (VHT-SIG-B) 514. The data unit 500 also includes a data portion 516.

In an embodiment, the data unit 500 occupies a bandwidth that is an integer multiple of 20 MHz and the L-STF 502 is duplicated within each 20 MHz sub-band. In an embodiment, the VHT-STF 510 has a duration of 4.0 microseconds and uses a same frequency sequence as the L-STF 502. For example, in an embodiment, the VHT-STF 510 uses the frequency sequence defined in equation 22-29 of the IEEE 802.11ac standard. In at least some embodiments, the VHT-STF 510 occupies a whole bandwidth for the data unit 500 (e.g., 20 MHz, 40 MHz, 80 MHz, etc.) and is mapped to multiple antennas for multiple input, multiple output (MIMO) or beamforming in a manner similar to the data portion 516.

Figure 6:
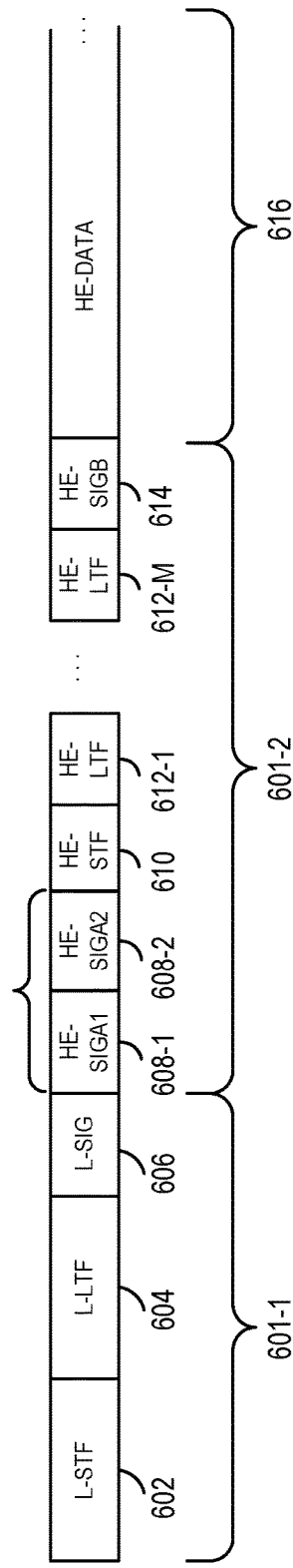
FIG. 6 is a diagram of an example orthogonal frequency division multiplexing (OFDM) data unit, according to an embodiment.

FIG. 6 is a diagram of an OFDM data unit 600 that the AP 14 is configured to transmit to the client station 25-1 via orthogonal frequency domain multiplexing (OFDM) modulation, according to an embodiment. In an embodiment, the client station 25-1 is also configured to transmit the data unit 600 to the AP 14. The data unit 600 conforms to the first communication protocol and occupies a 20 MHz bandwidth. Data units that conform to the first communication protocol similar to the data unit 600 may occupy other suitable bandwidths such as 40 MHz, 80 MHz, 160 MHz, 320 MHz, 640 MHz, etc., for example, or other suitable bandwidths, in other embodiments. The data unit 600 is suitable for "mixed mode" situations, i.e., when the WLAN 10 includes a client station (e.g., the legacy client station 25-4) that conforms to a legacy communication protocol, but not the first communication protocol. The data unit 600 is utilized in other situations as well, in some embodiments.

In an embodiment, the data unit 600 includes a preamble 601 having an L-STF 602, an L-LTF 604, an L-SIG 606, two first HE signal fields (HE-SIGAs) 608 including a first HE signal field (HE-SIGA1) 608-1 and a second HE signal field (HE-SIGA2) 608-2, a HE short training field (HE-STF) 610, M HE long training fields (HE-LTFs) 612, and a third HE signal field (HE-SIGB) 614. In an embodiment, the preamble 601 includes a legacy portion 601-1, including the L-STF 602, the L-LTF 604, and the L-SIG 606, and a non-legacy portion 601-2, including the HE-SIGAs 608, HE-STF 610, M HE-LTFs 612, and HE-SIGB 614.

Each of the L-STF 602, the L-LTF 604, the L-SIG 606, the HE-SIGAs 608, the HE-STF 610, the M HE-LTFs 612, and the HE-SIGB 614 are included in an integer number of one or more OFDM symbols. For example, in an embodiment, the HE-SIGAs 608 correspond to two OFDM symbols, where the HE-SIGA1 608-1 field is included in the first OFDM symbol and the HE-SIGA2 is included in the second OFDM symbol. In another embodiment, for example, the preamble 601 includes a third HE signal field (HE-SIGA3, not shown) and the HE-SIGAs 608 correspond to three OFDM symbols, where the HE-SIGA1 608-1 field is included in the first OFDM symbol, the HE-SIGA2 is included in the second OFDM symbol, and the HE-SIGA3 is included in the third OFDM symbol. In at least some examples, the HE-SIGAs 608 are collectively referred to as a single HE signal field (HE-SIGA) 608. In some embodiments, the data unit 600 also includes a data portion 616. In other embodiments, the data unit 600 omits the data portion 616 (e.g., the data unit 600 is a null-data packet).

In the embodiment of FIG. 6, the data unit 600 includes one of each of the L-STF 602, the L-LTF 604, the L-SIG 606, and the HE-SIGA1s 608. In other embodiments in which an OFDM data unit similar to the data unit 600 occupies a cumulative bandwidth other than 20 MHz, each of the L-STF 602, the L-LTF 604, the L-SIG 606, the HE-SIGA1s 608 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 602, the L-LTF 604, the L-SIG 606, and the HE-SIGA1s 608 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second subband is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 600, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

Figure 7:
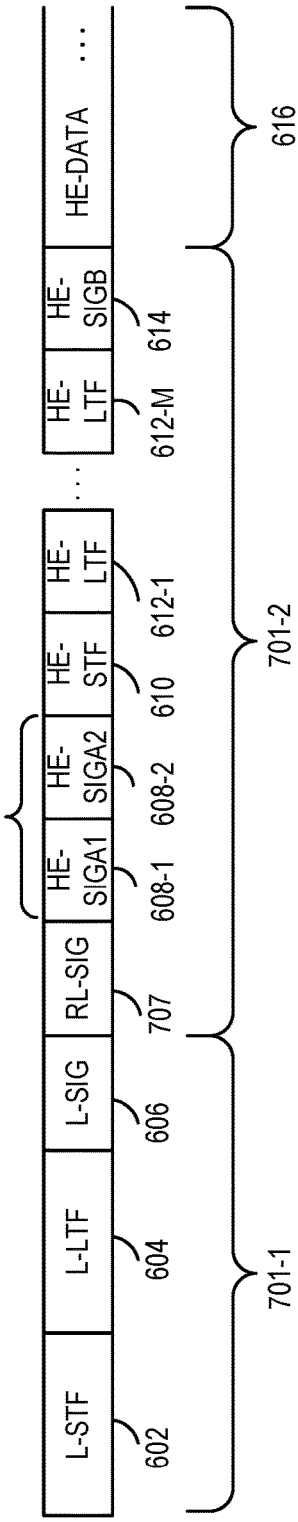
FIG. 7 is a diagram of an example OFDM data unit, according to an embodiment.

FIG. 7 is a diagram of an OFDM data unit 700, according to an embodiment. The OFDM data unit 700 includes a preamble 701. The data unit 700 is generally similar to the data unit 600 of FIG. 6, except that the preamble 701 of the data unit 700 is formatted differently from the preamble 601 of the data unit 600. In an embodiment, the preamble 701 is formatted such that a receiving device that operates according to the HEW communication protocol (e.g., 802.11ax) is able to determine that the preamble 701 is a preamble of the HEW communication protocol rather than another preamble. In an embodiment, the preamble 701 includes an L-STF 602, an L-LTF 601, an L-SIG 606, a repeated legacy signal field (RL-SIG) 707 that follows the L-SIG 606, and one or more first HEW signal fields (HEW-SIGAs) 608. In some embodiments, the preamble 701 also includes an HEW-STF 610, one or more HEW-LTF fields 612, and a second HEW signal field (HEW-SIGB) 614. In other embodiments, the preamble 701 omits the HEW-STF 610, the HEW-LTF(s) 612 and/or the HEW-SIGB 614. In an embodiment, the data unit 700 also includes a data portion 616 (not shown in FIG. 11B).

In an embodiment, the AP 14 and/or client station 25-1 utilize the data unit 700 instead of the data unit 600. In another embodiment, the AP 14 and/or the client station 25-1 utilize both the data unit 700 and the data unit 600 in various scenarios. In some scenarios, a potential for "false triggering" of an flax classification of a data unit (i.e., misidentifying an 801.11a data unit as an 802.11ax data unit) exists when a first data symbol (e.g., a first OFDM symbol of the data portion 208) and an HE-SIG 608 are quite "alike." In other words, the received OFDM symbols are similar such that corresponding decoded bits do not have a suitable Hamming distance to provide accurate decoding in some scenarios. The RL-SIG 707 is configured to provide for a more reliable auto-detection of the first communication protocol (e.g., to determine that a received data unit conforms to the IEEE 802.11ax protocol instead of another protocol, such as 802.11a, 802.11g, 802.11n, or 802.11ac) and to provide a more prompt auto-detection (e.g., before the HE-SIG 608) of the first communication protocol in response to a receipt of the data unit 700. In some embodiments, the RL-SIG 707 provides improved reliability of decoding the L-SIG 606. In some embodiments, the RL-SIG 707 is also scrambled to reduce false triggering, as described below.

Figure 8:
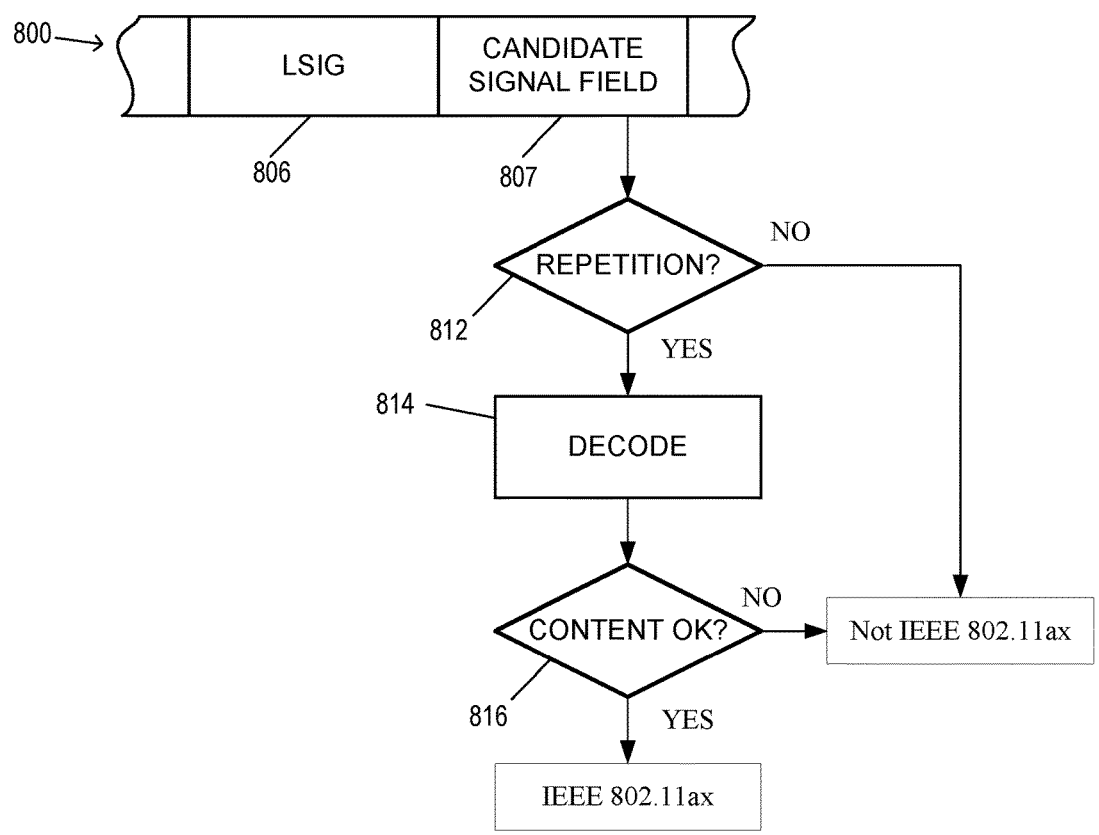
FIG. 8 is a diagram of an example method for determining whether a received data unit corresponds to a first communication protocol.

FIG. 8 is a diagram of an example method for determining whether a received OFDM data unit 800 corresponds to the first communication protocol or a different communication protocol, in an embodiment. In the embodiment described with respect to FIG. 8, the data unit 800 is generated by the AP 14 and received and/or decoded by the client station 25. In other embodiments, the client station 25 generates the data unit 800 and the AP 14 receives and/or decodes the data unit 800. In still other embodiments, a first AP generates the data unit 800 and a second AP receives and/or decodes the data unit 800, or a first client station generates the data unit 800 and a second client station receives and/or decodes the data unit 800.

As the data unit 800 is received, the client station 25 decodes at least some of the data unit 800 to determine the communication protocol of the data unit 800. As shown in FIGS. 2A, 3, 5, and 7, various data units generated according to different communication protocols have at least some common fields, for example, L-STF, L-LTF, and L-SIG. The data unit 800 includes an L-STF field (not shown), an L-LTF field (not shown), an L-SIG field 806, a candidate signal field 807, in the illustrated embodiment. In other embodiments, the data unit 800 includes additional fields (not shown).

After receipt of a first OFDM symbol that includes the L-SIG field 806, the client station 25 receives a second OFDM symbol that follows the first OFDM symbol and includes a second field, referred to herein as a candidate signal field 807. In one scenario, the data unit 800 corresponds to the IEEE 802.11a protocol and the candidate signal field 807 corresponds to a first OFDM symbol of the data field 208 (see FIG. 2A). In another scenario, the data unit 800 corresponds to the first communication protocol (e.g., the IEEE 802.11ax protocol) and the candidate signal field 807 corresponds to the repeated legacy signal field 707 (see FIG. 7).

At block 812, in response to a receipt of the second OFDM symbol, the client station 25 determines whether the candidate signal field 807 corresponds to a repetition of the L-SIG field 806, in various embodiments. In an embodiment, the client station 25 determines a time-domain correlation of the first OFDM symbol and the second OFDM symbol to determine whether the candidate signal field 807 corresponds to the repetition. In another embodiment, the client station 25 i) decodes the first OFDM symbol and the second OFDM symbol to obtain respective first and second bit sequences, and ii) compares the first and second bit sequences to determine whether the candidate signal field 807 corresponds to the repetition. In yet another embodiment, the client station 25 utilizes a different suitable auto-detection method or comparison of the L-SIG field 806 and the candidate signal field 807 to determine whether the candidate signal field 807 corresponds to the repetition. In response to a determination that the candidate signal field 807 does not correspond to a repetition of the L-SIG field 806 (NO at block 812), the client station 25 determines that the received data unit 800 does not correspond to the first communication protocol (e.g., the IEEE 802.11ax protocol), in an embodiment.

In response to a determination that the candidate signal field 807 corresponds to a repetition of the L-SIG field 806 (YES at block 812), the client station 25 proceeds to block 814 and decodes the candidate signal field 807 to obtain a signal field bit sequence, in an embodiment. In another embodiment, the client station 25 decodes the L-SIG field 806 to obtain the signal field bit sequence. In yet another embodiment, the client station 25 combines or averages the first OFDM symbol with the second OFDM symbol and decodes the combined symbol to obtain the signal field bit sequence. In at least some scenarios, the combining and/or averaging of the OFDM symbols improves the decoding accuracy of the L-SIG field 806.

At block 816, the client station 25 determines whether the signal field bit sequence has a valid content value for the first communication protocol. In other words, the client station 25 determines whether the content of the L-SIG field 806 has an allowed value that conforms to the first communication protocol (e.g., an 11ax-content-consistent L-SIG value). In an embodiment, the client station 25 determines that the content of the L-SIG field 806 corresponds to the first communication protocol where one or more of the following content checks are true: i) the rate subfield corresponds to a data rate of six megabits per seconds (e.g., a value of "1101"), ii) a reserved subfield is set to zero, iii) a length subfield within a suitable range and that cannot be divided by three (e.g., a range between 32 bytes and 2403 bytes), iv) a parity subfield indicates a suitable parity value, or v) a tail subfield includes a suitable tail value (e.g., "000000"). In other embodiments, the client station 25 performs other suitable content checks, in addition to or instead of the above-described content checks, to determine whether the content of the L-SIG field 806 corresponds to the first communication protocol (or another suitable communication protocol). In response to a determination that the content of the L-SIG field 806 corresponds to the first communication protocol, the client station 25 decodes at least some of the OFDM symbols of the data unit 800 according to the first communication protocol.

Figure 9:
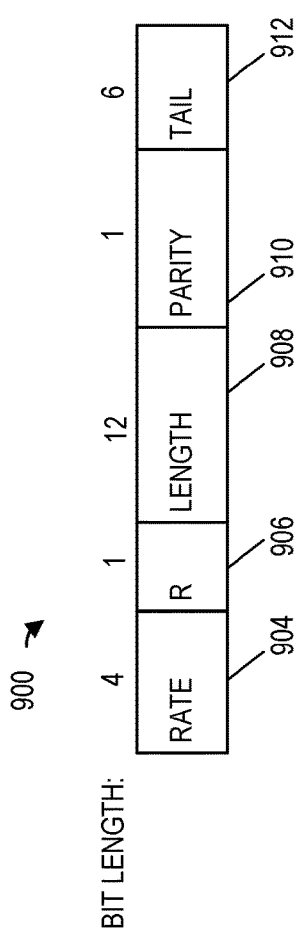
FIG. 9 is a diagram of example bits for an OFDM symbol that includes a legacy signal field, according to an embodiment.
Figure 10:
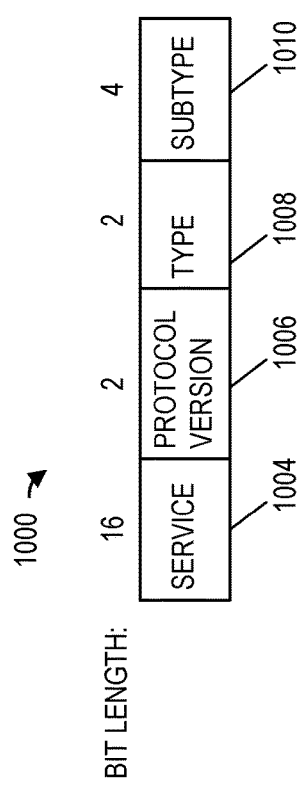
FIG. 10 is a diagram of example bits for an OFDM symbol that includes a first portion of a data unit, according to an embodiment.

FIG. 9 is a diagram of example subfields for an OFDM symbol 900 that corresponds to a legacy signal field of an OFDM data unit, according to an embodiment. FIG. 10 is a diagram of example subfields for an OFDM symbol 1000 that corresponds to a first OFDM symbol of a data portion of a data unit, according to an embodiment. The number above each subfield in FIG. 9 and FIG. 10 indicates the number of bits occupied by the corresponding subfield. In various embodiments and/or scenarios, the OFDM symbol 900 or the OFDM symbol 1000 correspond to the candidate signal field 807, as described above with respect to FIG. 8. In other words, where the data unit 800 corresponds to the first communication protocol (i.e., IEEE 802.11ax), the candidate signal field 807 corresponds to the OFDM symbol 900, and where the data unit 800 corresponds to a different communication protocol (e.g., IEEE 802.11a), the candidate signal field 807 corresponds to the OFDM symbol 1000.

The subfields of the OFDM symbol 900 include a rate subfield 904, a reserved subfield 906, a length subfield 908, a parity subfield 910, and a tail subfield 912, in an embodiment. As described above, for a valid OFDM symbol 900 for the first communication protocol, one or more of the following content checks are true: i) the rate subfield 904 corresponds to a data rate of six megabits per seconds (e.g., a value of "1101"), ii) the reserved subfield 906 is set to zero, iii) the length subfield 908 is within a suitable range and that cannot be divided by three (e.g., a range between 32 bytes and 2403 bytes), iv) the parity subfield 910 indicates a suitable parity value, or v) the tail subfield 912 includes a suitable tail value (e.g., "000000").

The subfields of the OFDM symbol 1000 include a service subfield 1004, a protocol version subfield 1006, a type subfield 1008, and a subtype subfield 1010, in an embodiment. In various embodiments and/or scenarios, the service subfield 1004 has a value of 0x0 (e.g., sixteen zeros), the protocol version subfield 1006 has a value of 00, the type subfield 1008 has a value of 00, 01, or 10, and the subtype subfield 1010 has a value of 0x0, 0x1, 0x2, . . . , 0xE, or 0xF (i.e., 1111).

In some scenarios, a data unit corresponding to a communication protocol different from the first communication protocol may cause false triggering of the first communication protocol if i) the L-SIG field 806 suitably passes the content checks described above, and ii) the candidate signal field 807 (i.e., the first OFDM symbol of a data portion of the data unit) has a value that sufficiently matches the L-SIG field 806. In one such scenario, for example, the first OFDM symbol of the data portion (modulated using an MCS0 modulation and control scheme) has a small Hamming distance with the L-SIG 806 such that the symbols pass the repetition detection described above. The Hamming distance $D_{Hamming}$ corresponds to:

$$D_{Haming} = \sum_{i=0}^{47} s_i \oplus d_i \quad \text{(Equation 1)}$$

where $s_i$ and $d_i$ are the 48 coded bits of the legacy signal field (i.e., corresponding to OFDM symbol 900) and data portion (i.e., corresponding to OFDM symbol 1000), respectively.

In various embodiments and/or scenarios, the client station 25 (or AP 14) scrambles at least some of the bits of the repeated legacy signal field 707. In an embodiment, the client station 25 scrambles the signal field bit sequence (e.g., repeated or copies from the L-SIG field 806) with a scrambling bit sequence to obtain a scrambled bit sequence and generates the OFDM symbol based on the scrambled bit sequence. In an embodiment, the scrambling bit sequence is a known sequence that is selected to improve the minimal Hamming distance. In an embodiment, the coded bits are processed with an exclusive OR operation and the scrambling bit sequence (i.e., a sequence of zeros and ones). In some scenarios, the exclusive OR operation effectively flips the sign of certain binary phase shift keying (BPSK) data tones.

Figure 11:
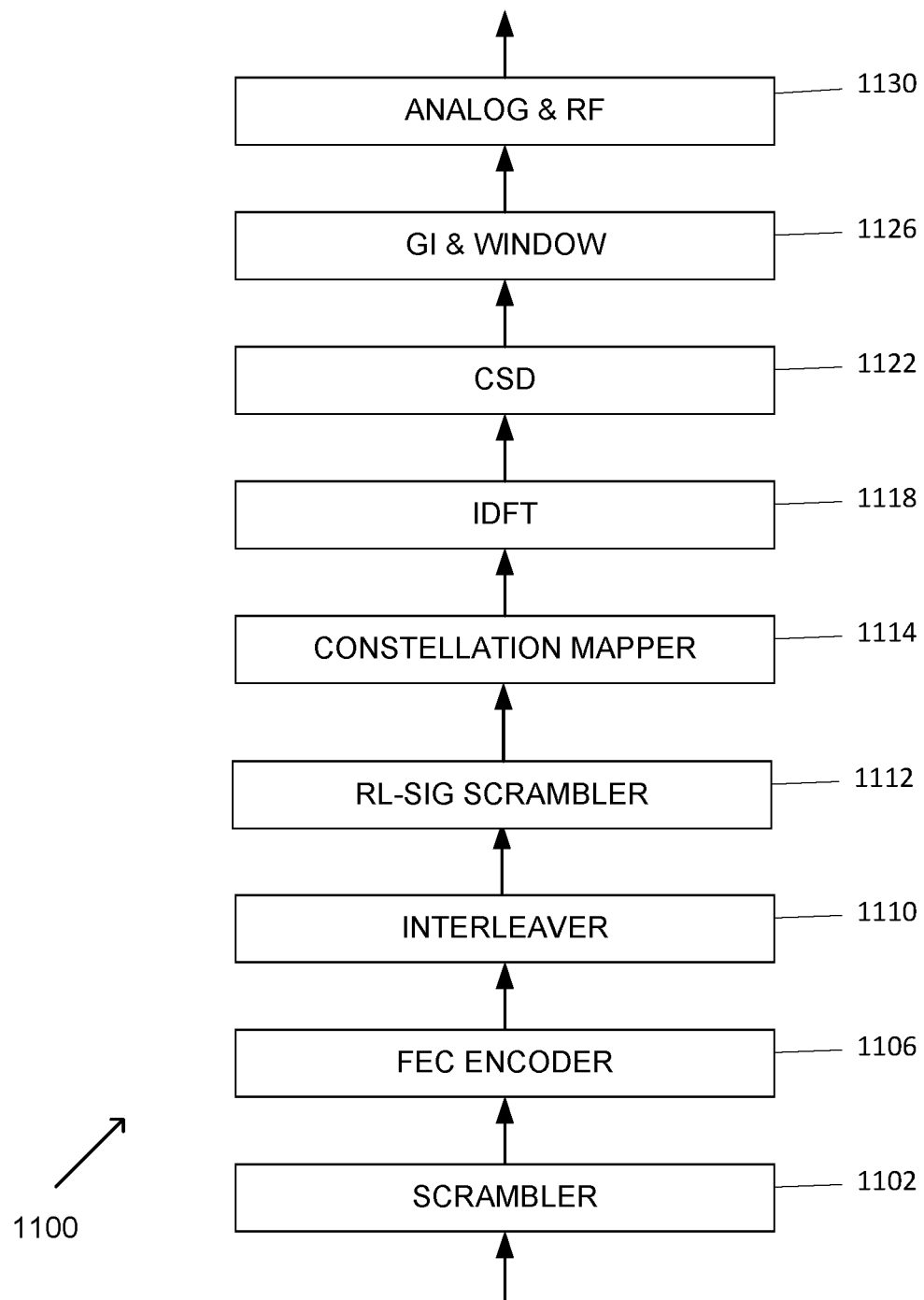
FIG. 11 is a block diagram illustrating an example PHY processor for generating data units, according to an embodiment.

FIG. 11 is a block diagram illustrating an example PHY processor 1100 for generating data units using having an RL-SIG field that is scrambled, according to an embodiment. Referring to FIG. 1, the AP 14 and the client station 25-1, in one embodiment, each include a PHY processor such as the PHY processor 1100. The PHY processor 1100 includes a scrambler 1102 that generally scrambles an information bit stream to reduce the occurrence of long sequences of ones or zeros. A forward error correction (FEC) encoder 1106 encodes scrambled information bits to generate encoded data bits. In one embodiment, the FEC encoder 1106 includes a binary convolutional code (BCC) encoder. In another embodiment, the FEC encoder 1106 includes a binary convolutional encoder followed by a puncturing block. In yet another embodiment, the FEC encoder 1106 includes a low density parity check (LDPC) encoder. An interleaver 1110 receives the encoded data bits and interleaves the bits (i.e., changes the order of the bits) to prevent long sequences of adjacent noisy bits from entering a decoder at the receiver. A repeated legacy signal scrambler (RL-SIG scrambler) 1112 scrambles bits of the encoded data bits from the interleaver 1110 that correspond to the RL-SIG field 707, in an embodiment. A constellation mapper 1114 maps the scrambled, interleaved sequence of bits to constellation points corresponding to different subcarriers of an OFDM symbol. More specifically, for each spatial stream, the constellation mapper 1114 translates every bit sequence of length $\log_2(M)$ into one of M constellation points.

The output of the constellation mapper 1114 is operated on by an inverse discrete Fourier transform (IDFT) processor 1118 that converts a block of constellation points to a time-domain signal. In embodiments or situations in which the PHY processor 1100 operates to generate data units for transmission via multiple spatial streams, the cyclic shift diversity (CSD) processor 1122 inserts a cyclic shift into all but one of the spatial streams to prevent unintentional beamforming. The output of the CSD processor 1122 is provided to the guard interval (GI) insertion and windowing processor 1126 that prepends, to an OFDM symbol, a circular extension of the OFDM symbol and smooths the edges of each symbol to increase spectral decay. The output of the GI insertion and windowing processor 1126 is provided to the analog and radio frequency (RF) processor 1130 that converts the signal to analog signal and upconverts the signal to RF frequency for transmission.

Although the RL-SIG scrambler 1112 in the embodiment shown in FIG. 11 is located between the interleaver 1110 and the constellation mapper 1114, the RL-SIG scrambler 1112 is located in other suitable locations in other embodiments. In an embodiment, for example, the RL-SIG scrambler 1112 is located after the FEC encoder 1106 and before the interleaver 1110. In another embodiment, the RL-SIG scrambler 1112 is located after the constellation mapper 1114 and before the IDFT 1118.

Figure 12:
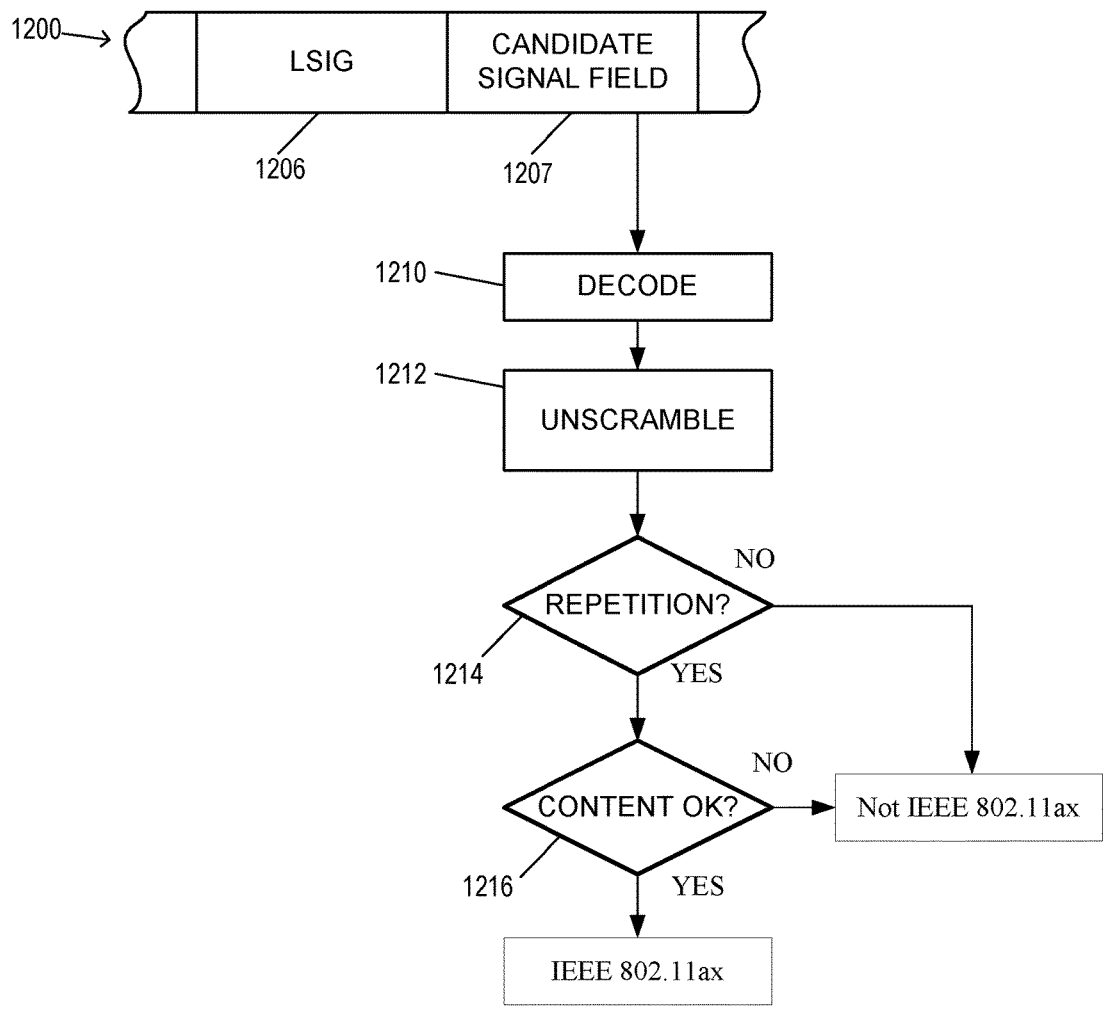
FIG. 12 is a diagram illustrating an example method for decoding a data unit, according to an embodiment.

FIG. 12 is a diagram of an example method for determining whether a received OFDM data unit 1200 corresponds to the first communication protocol or a different communication protocol, in an embodiment. In the embodiment described with respect to FIG. 12, the data unit 1200 is generated by the AP 14 and received and/or decoded by the client station 25. In other embodiments, the client station 25 generates the data unit 1200 and the AP 14 receives and/or decodes the data unit 1200. In still other embodiments, a first AP generates the data unit 1200 and a second AP receives and/or decodes the data unit 1200, or a first client station generates the data unit 1200 and a second client station receives and/or decodes the data unit 1200.

In the embodiment shown in FIG. 12, the data unit 1200 is generally similar to the data unit 800 described above with respect to FIG. 8 and includes an L-SIG field 1206 and a candidate signal field 1207, corresponding to first and second OFDM symbols, except that the candidate signal field 1207 for the first communication protocol is also scrambled. In other words, where the candidate signal field 1207 corresponds to the first communication protocol, the candidate signal field 1207 is a repetition of the L-SIG field that has been scrambled. In an embodiment, the client station 25 unscrambles the OFDM symbol that follows the L-SIG field 1206 to classify the data unit 1200. In a scenario where a data unit corresponding to the first communication protocol is received, unscrambling does not significantly impact (e.g., delay or increase complexity) the repetition detection. In a scenario where a data unit corresponding to a different communication protocol is received, the first OFDM symbol is also unscrambled and a larger Hamming distance reduces false triggering, as described above. For example, the Hamming distance $D_{Hammming}$ corresponds to:

$$D_{Haming} = \sum_{i=0}^{47} s_i \oplus (c_i \oplus d_i) \quad \text{(Equation 2)}$$

where $s_i$ and $d_i$ are the 48 coded bits of the legacy signal field and data portion, respectively, as described above, and $c_i$ is a 48 bit scrambling bit sequence.

After receipt of a first OFDM symbol that includes the L-SIG field 1206, the client station 25 receives a second OFDM symbol that follows the first OFDM symbol and includes the candidate signal field 1207. In one scenario, the data unit 1200 corresponds to the IEEE 802.11a protocol and the candidate signal field 1207 corresponds to a first OFDM symbol of the data field 208 (see FIG. 2A). In another scenario, the data unit 1200 corresponds to the first communication protocol (e.g., the IEEE 802.11ax protocol) and the candidate signal field 1207 corresponds to the repeated legacy signal field 707 (see FIG. 7) and has been scrambled.

At block 1210, the client station 25 decodes i) the first OFDM symbol to obtain a signal field bit sequence that corresponds to the L-SIG field 1206, and ii) the second OFDM symbol to obtain a candidate bit sequence that corresponds to the candidate signal field 1207.

At block 1212, the client station 25 unscrambles the candidate bit sequence with a scrambling bit sequence that corresponds to the first communication protocol to obtain an unscrambled bit sequence that corresponds to the candidate signal field 1207.

At block 1214, the client station 25 determines whether the candidate signal field 1207 corresponds to a repetition of the L-SIG field 1206, in various embodiments. In an embodiment, the client station 25 compares the signal field bit sequence and the unscrambled bit sequence to determine whether the candidate signal field 1207 corresponds to the repetition of the L-SIG field 1206. In yet another embodiment, the client station 25 utilizes a different suitable comparison of the L-SIG field 1206 and the candidate signal field 1207. In response to a determination that the candidate signal field 1207 does not correspond to a repetition of the L-SIG field 1206 (NO at block 1214), the client station 25 determines that the received data unit 1200 does not correspond to the first communication protocol (e.g., the IEEE 802.11ax protocol), in an embodiment. In response to a determination that the candidate signal field 1207 corresponds to a repetition of the L-SIG field 1206 (YES at block 1212), the client station 25 proceeds to block 1216.

At block 1216, the client station 25 determines whether the signal field bit sequence (or the unscrambled bit sequence) has a valid content value for the first communication protocol. In other words, the client station 25 determines whether the content of the L-SIG field 1206 has an allowed value that conforms to the first communication protocol. In an embodiment, the client station 25 determines that the content of the L-SIG field 1206 corresponds to the first communication protocol where one or more of the following content checks are true: i) the rate subfield corresponds to a data rate of six megabits per seconds, ii) a reserved subfield is set to zero, iii) a length subfield cannot be divided by three, iv) a parity subfield indicates a suitable parity value, or v) a tail subfield includes a suitable tail value (e.g., "000000"). In other embodiments, the client station 25 performs other suitable content checks, in addition to or instead of the above-described content checks, to determine whether the content of the L-SIG field 1206 corresponds to the first communication protocol (or another suitable communication protocol). In response to a determination that the content of the L-SIG field 1206 corresponds to the first communication protocol, the client station 25 decodes at least some of the OFDM symbols of the data unit 1200 according to the first communication protocol.

Although the above-described embodiments utilize a single scrambling bit sequence, the AP 14 or client station 25 utilizes a plurality of scrambling bit sequences in other embodiments and/or scenarios. In other words, scrambling the signal field bit sequence includes selecting or identifying the scrambling bit sequence from a plurality of available scrambling bit sequences.

In some embodiments, multiple scrambling bit sequences are applied to the repeated legacy signal field. In an embodiment, a communication device that receives the data unit (e.g., AP 14 or client station 25) performs a hypothetical detection on both the repetition of the signal field bit sequence and the scrambling bit sequence itself. In an embodiment, for example, the client station 25 i) unscrambles the candidate bit sequence with each of a plurality of scrambling bit sequences to obtain a respective unscrambled bit sequence for each of the plurality of scrambling bit sequences, and ii) determines whether the respective unscrambled bit sequence for each of the plurality of scrambling bit sequences is a repetition of the signal field bit sequence. In an embodiment, at least some of the scrambling bit sequences are "detected" in parallel. In an embodiment, at least some of the scrambling bit sequences are detected in a sequential order, thus subsequent scrambling bit sequences are disregarded when an earlier scrambling bit sequence has been detected.

In an embodiment, for example, the plurality of scrambling bit sequences includes scrambling bit sequences X, Y, and Z, the signal field bit sequence is S, and the candidate bit sequence is C. In this embodiment, the client station determines whether i) S equals C⊕X, ii) S equals C⊕Y, and iii) S equals C⊕Z. In response to determining that S equals C⊕X, then X is identified as the scrambling bit sequence. In response to determining that S equals C⊕YW, then Y is identified as the scrambling bit sequence. In response to determining that S equals C⊕Z, then Z is identified as the scrambling bit sequence. In some embodiments, the identified scrambling bit sequence corresponds to a communication protocol. In an embodiment, for example, the AP 14 (or other suitable transmitting device) selects the scrambling bit sequence to identify the communication protocol with which the data unit is encoded to the client station 25 (or suitable receiving device). In other words, the AP 14 selects the scrambling bit sequence X to indicate the first communication protocol, the scrambling bit sequence Y to indicate a second communication protocol, or the scrambling bit sequence Z to indicate a third communication protocol. In other embodiments, a parameter, value, protocol version, condition, or other suitable information is indicated by the selected scrambling bit sequence.

In some embodiments where a plurality of scrambling bit sequences are utilized, the AP 14 selects the scrambling bit sequence to improve the Hamming distance and thus prevent false triggering. In an embodiment, the scrambling bit sequences are generally orthogonal to each other or have low cross correlation.

In some embodiments, the AP 14 selects a scrambling bit sequence that maximizes a minimal Hamming distance. In an embodiment, for example, the AP 14 determines, for each of a plurality of scrambling bit sequences, a respective minimal Hamming distance over all pairs of valid candidate bit sequences for 11 ax-content-consistent L-SIG values and valid candidate bit sequences for a first portion of a data field that corresponds to the different communication protocol (e.g., IEEE 802.11a). In an embodiment, for example, the AP 14 determines an optimal scrambling bit sequence $c_i^*$:

$$\{c_i^*\} = \frac{\arg\max}{\{c_i\}}\left(\min_{\{s_i\},\{d_i\}}\left(\sum_{i=0}^{47} s_i \oplus (c_i \oplus d_i)\right)\right) \quad \text{(Equation 3)}$$

Accordingly, the scrambling bit sequence corresponds to a maximized minimal Hamming distance between i) valid candidate bit sequences for the legacy signal field that correspond to the first communication protocol (e.g., IEEE 802.11ax), and ii) valid candidate bit sequences for a first portion of a data field that corresponds to the different communication protocol (e.g., IEEE 802.11a).

In some embodiments and/or scenarios, the optimal scrambling bit sequence is too computationally complex to find using available resources or in an efficient manner. In an embodiment, the AP 14 determines a sub-optimal scrambling bit sequence using a subset of bits Ω. In an embodiment, for example, the scrambling bit sequence corresponds to a maximized minimal Hamming distance between i) a subset of bits of the valid candidate bit sequences for the legacy signal field that correspond to the second communication protocol, and ii) a corresponding subset of bits of the valid candidate bit sequences for a first portion of a data field that corresponds to the first communication protocol:

$$\{c_i^*\} = \frac{\arg\max}{\{c_i\}}\left(\min_{\{s_i\},\{d_i\}}\left(\sum_{i=\Omega} s_i \oplus (c_i \oplus d_i)\right)\right) \quad \text{(Equation 4)}$$

In an embodiment, for example, a sub-optimal scrambling bit sequence is:

[1 1 1 1 1 1 1 0 1 1 1 1 1 1 1 1 1 1 1 1 0 1 0 1 0 1
0 0 0 0 1 0 0 0 0 0 1 0 0 0 0 0 0 0 0 0 0 0 0] (Equation 5)

where the scrambling bit sequence is applied before the interleaver 1110 (FIG. 11). In this embodiment, the minimal Hamming distance between all pairs of valid candidate bit sequences for flax-content-consistent L-SIG values and valid candidate bit sequences for a first portion of a data field that corresponds to the different communication protocol (e.g., IEEE 802.11a) is increased from five to ten.

Figure 13:
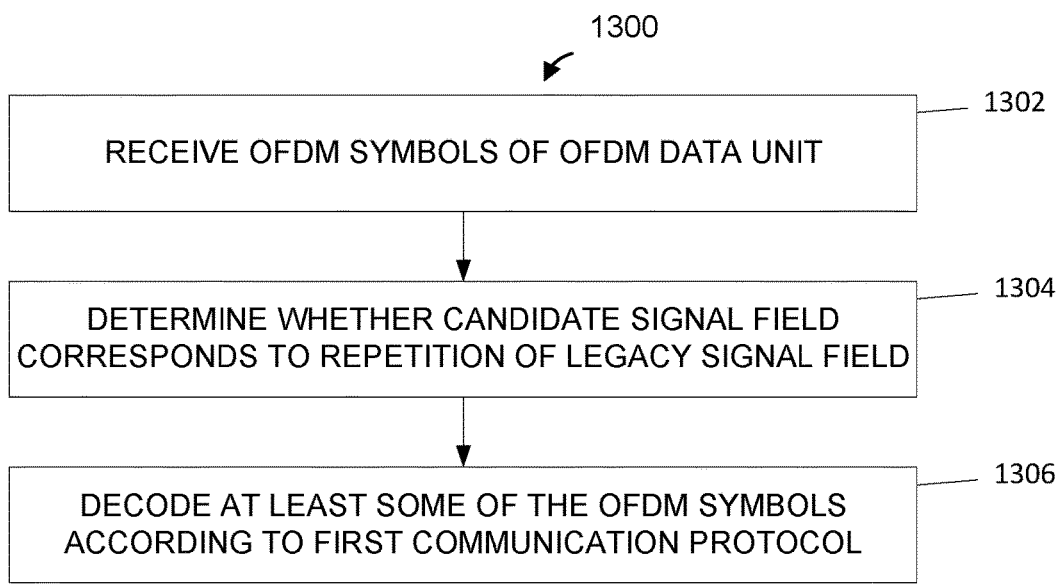
FIG. 13 is a diagram illustrating an example method for generating a data unit having a repeated legacy signal field, according to an embodiment.

FIG. 13 is a flow diagram illustrating an example method 1300 for generating a data unit having a repeated legacy signal field, according to an embodiment. In an embodiment, the method 1300 is implemented by a client station in the WLAN, according to an embodiment. With reference to FIG. 1, the method 1300 is implemented by the network interface 27, in an embodiment. For example, in one such embodiment, the PHY processor 29 is configured to implement the method 1300. According to another embodiment, the MAC processing 28 is also configured to implement at least a part of the method 1300. With continued reference to FIG. 1, in yet another embodiment, the method 1300 is implemented by the network interface 16 (e.g., the PHY processor 20 and/or the MAC processor 18). In other embodiments, the method 1300 is implemented by other suitable network interfaces.

At block 1302, OFDM symbols of an OFDM data unit are received that include a first OFDM symbol that corresponds to a legacy signal field followed by a second OFDM symbol that corresponds to a candidate signal field, in an embodiment. In an embodiment, the first OFDM symbol corresponds to the L-SIG field 806 and the second OFDM symbol corresponds to the candidate signal field 807. In another embodiment, the first OFDM symbol corresponds to the L-SIG field 1206 and the second OFDM symbol corresponds to the candidate signal field 1207.

At block 1304, it is determined whether the candidate signal field corresponds to a repetition of the legacy signal field, in an embodiment. In an embodiment, the determination is made according to block 812, as described above with respect to FIG. 8. In another embodiment, the determination is made according to blocks 812, 814, and 816, as described above with respect to FIG. 8. In another embodiment, the determination is made according to blocks 1214 and 1216, as described above with respect to FIG. 12.

At block 1306, at least some of the OFDM symbols of the OFDM data unit are decoded according to a first communication protocol indicated by the determination of whether the candidate signal field corresponds to the repetition of the legacy signal field. In one scenario, for example, the non-legacy signal field 608 is decoded according to the IEEE 802.11ax protocol in response to a determination that the candidate signal field corresponds to the repetition of the legacy signal field. In another scenario, the data field 208 is decoded according to the IEEE 802.11a protocol in response to a determination that the candidate signal field does not correspond to the repetition of the legacy signal field.

Figure 14:
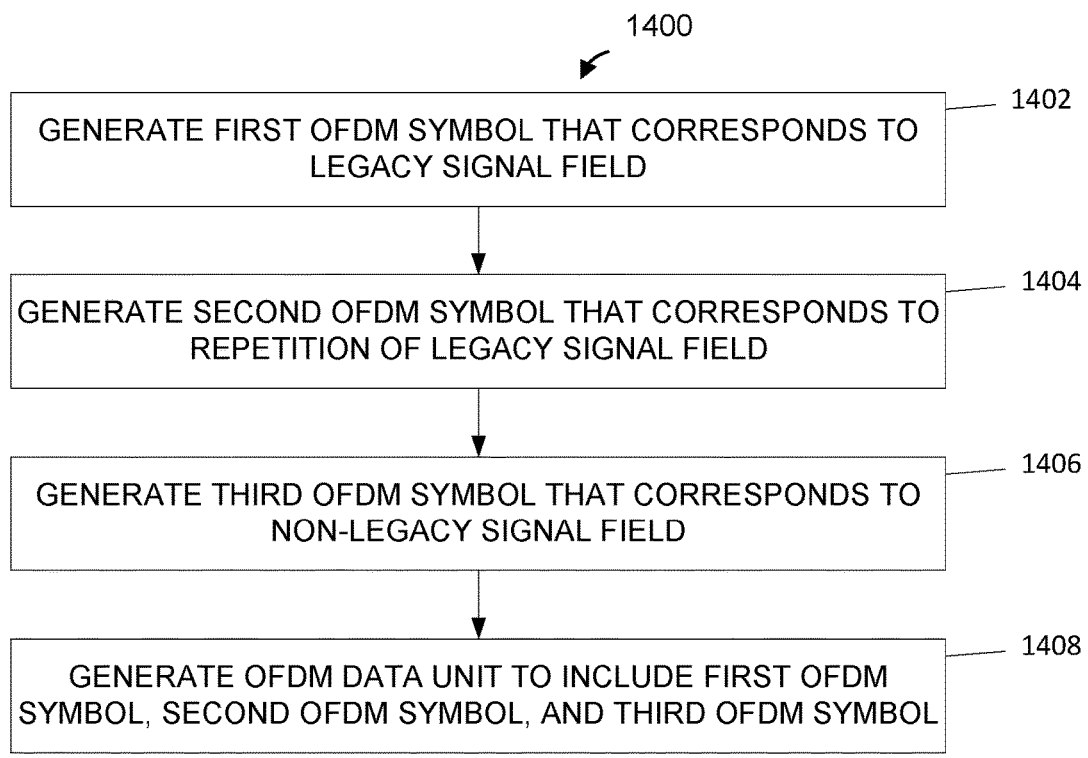
FIG. 14 is a diagram illustrating an example method for decoding a data unit, according to an embodiment.

FIG. 14 is a flow diagram illustrating an example method 1400 for decoding a data unit, according to an embodiment. In an embodiment, the method 1400 is implemented by a client station in the WLAN, according to an embodiment. With reference to FIG. 1, the method 1400 is implemented by the network interface 27, in an embodiment. For example, in one such embodiment, the PHY processor 29 is configured to implement the method 1400. According to another embodiment, the MAC processing 28 is also configured to implement at least a part of the method 1400. With continued reference to FIG. 1, in yet another embodiment, the method 1400 is implemented by the network interface 16 (e.g., the PHY processor 20 and/or the MAC processor 18). In other embodiments, the method 1400 is implemented by other suitable network interfaces.

At block 1402, a first OFDM symbol is generated that corresponds to a legacy signal field, the legacy signal field corresponding to a first communication protocol, in an embodiment. The first OFDM symbol corresponds to the L-SIG field 806 and the first communication protocol corresponds to a legacy communication protocol, in an embodiment. In another embodiment, the first OFDM symbol corresponds to the L-SIG field 1206.

At block 1404, a second OFDM symbol is generated that corresponds to a repetition of the legacy signal field to indicate a second communication protocol that is different from the first communication protocol, in an embodiment. The second OFDM symbol corresponds to the candidate signal field 807 and the second communication protocol corresponds to the IEEE 802.11ax protocol, in an embodiment. In another embodiment, the second OFDM symbol corresponds to the candidate signal field 1207 and the second communication protocol corresponds to the IEEE 802.11ax protocol.

At block 1406, a third OFDM symbol is generated that corresponds to a non-legacy signal field, the non-legacy signal field corresponding to the second communication protocol, in an embodiment. In an embodiment, the non-legacy signal field corresponds to the non-legacy signal field 608.

At block 1408, the OFDM data unit is generated to include the first OFDM symbol, followed by the second OFDM symbol, followed by the third OFDM symbol, in an embodiment. In an embodiment, for example, the data unit 700 is generated.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   receiving, by a communication device, orthogonal frequency division multiplexing (OFDM) symbols of a physical layer (PHY) data unit that includes i) a first OFDM symbol corresponding to a legacy signal field of a PHY preamble of the PHY data unit, and ii) a second OFDM symbol that immediately follows the first OFDM symbol;
   determining, by the communication device, whether the second OFDM symbol corresponds to a repetition of the legacy signal field, including:
     determining a first bit sequence corresponding to the first OFDM symbol,
     determining a second bit sequence corresponding to the second OFDM symbol,
     performing an unscrambling procedure on the second bit sequence using a scrambling bit sequence that corresponds to a first communication protocol to obtain an unscrambled second bit sequence that corresponds to the second OFDM symbol, and
     determining whether the unscrambled second bit sequence matches the first bit sequence; and
   in response to a determination that the unscrambled second bit sequence matches the first bit sequence, decoding, by the communication device, at least some of the OFDM symbols of the PHY data unit according to the first communication protocol; and
   in response to a determination that the unscrambled second bit sequence does not match the first bit sequence, decoding, by the communication device, at least some of the OFDM symbols of the PHY data unit according to a second communication protocol.

2. The method of claim 1, wherein:
   the scrambling bit sequence that corresponds to the first communication protocol is a first scrambling bit sequence;
   the unscrambled second bit sequence is a first unscrambled second bit sequence; and
   determining, by the communication device, whether the second OFDM symbol corresponds to a repetition of the legacy signal field further comprises:
     performing an unscrambling procedure on the second bit sequence using a second scrambling bit sequence to obtain a second unscrambled second bit sequence, wherein the second scrambling bit sequence corresponds to a third communication protocol, determining whether the second unscrambled bit sequence matches the first bit sequence, and the method further comprises: in response to a determination that the second unscrambled second bit sequence matches the first bit sequence, decoding, by the communication device, at least some of the OFDM symbols of the PHY data unit according to the third communication protocol; and decoding at least some of the OFDM symbols of the PHY data unit according to the second communication protocol is further in response to a determination that the second unscrambled second bit sequence does not match the first bit sequence.

3. The method of claim 1, further comprising:

determining, by the communication device, whether the first bit sequence corresponds to valid signal field content for the first communication protocol;

in response to i) the determination that the unscrambled second bit sequence matches the first bit sequence, and ii) a determination that the first bit sequence does not correspond to valid signal field content for the first communication protocol, decoding, by the communication device, at least some of the OFDM symbols of the PHY data unit according to the second communication protocol;

wherein decoding the at least some of the OFDM symbols of the PHY data unit according to the first communication protocol is further in response to a determination that the first bit sequence corresponds to valid signal field content for the first communication protocol.

4. The method of claim 1, wherein the scrambling bit sequence corresponds to a maximized minimal Hamming distance between i) valid candidate bit sequences for the legacy signal field that correspond to the first communication protocol, and ii) valid candidate bit sequences for a first portion of a data field that corresponds to the second communication protocol.

5. The method of claim 1, wherein the scrambling bit sequence corresponds to a maximized minimal Hamming distance between i) a subset of bits of valid candidate bit sequences for the legacy signal field that correspond to the first communication protocol, and ii) a corresponding subset of bits of valid candidate bit sequences for a first portion of a data field that corresponds to the second communication protocol.

6. An apparatus, comprising:

a network interface device having one or more integrated circuits (ICs) configured to:

receive orthogonal frequency division multiplexing (OFDM) symbols of a physical layer (PHY) data unit that includes i) a first OFDM symbol corresponding to a legacy signal field of a PHY preamble of the PHY data unit, and ii) a second OFDM symbol that immediately follows the first OFDM symbol;

determine whether the second OFDM symbol corresponds to a repetition of the legacy signal field, including:

determining a first bit sequence corresponding to the first OFDM symbol, determining a second bit sequence corresponding to the second OFDM symbol, performing an unscrambling procedure on the second bit sequence using a scrambling bit sequence that corresponds to a first communication protocol to obtain an unscrambled second bit sequence that corresponds to the second OFDM symbol, and determining whether the unscrambled second bit sequence matches the first bit sequence;

in response to a determination that the unscrambled second bit sequence matches the first bit sequence, decode at least some of the OFDM symbols of the PHY data unit according to the first communication protocol; and in response to a determination that the unscrambled second bit sequence does not match the first bit sequence, decode at least some of the OFDM symbols of the PHY data unit according to a second communication protocol.

7. The apparatus of claim 6, wherein:

the scrambling bit sequence that corresponds to the first communication protocol is a first scrambling bit sequence;

the unscrambled second bit sequence is a first unscrambled second bit sequence; and the one or more ICs are further configured to:

perform an unscrambling procedure on the second bit sequence using a second scrambling bit sequence to obtain a second unscrambled second bit sequence, wherein the second scrambling bit sequence corresponds to a third communication protocol, determine whether the second unscrambled bit sequence matches the first bit sequence, in response to a determination that the second unscrambled second bit sequence matches the first bit sequence, decode at least some of the OFDM symbols of the PHY data unit according to the third communication protocol, and decode at least some of the OFDM symbols of the PHY data unit according to the second communication protocol further in response to a determination that the second unscrambled second bit sequence does not match the first bit sequence.

8. The apparatus of claim 6, wherein the one or more ICs are further configured to:

determine whether the first bit sequence corresponds to valid signal field content for the first communication protocol;

in response to i) the determination that the unscrambled second bit sequence matches the first bit sequence, and ii) a determination that the first bit sequence does not correspond to valid signal field content for the first communication protocol, decode at least some of the OFDM symbols of the PHY data unit according to the second communication protocol;

decode the at least some of the OFDM symbols of the PHY data unit according to the first communication protocol further in response to a determination that the first bit sequence corresponds to valid signal field content for the first communication protocol.

9. The apparatus of claim 6, wherein the scrambling bit sequence corresponds to a maximized minimal Hamming distance between i) valid candidate bit sequences for the legacy signal field that correspond to the first communication protocol, and ii) valid candidate bit sequences for a first portion of a data field that corresponds to the second communication protocol.

10. The apparatus of claim 9, wherein the scrambling bit sequence corresponds to a maximized minimal Hamming distance between i) a subset of bits of valid candidate bit sequences for the legacy signal field that correspond to the first communication protocol, and ii) a corresponding subset of bits of valid candidate bit sequences for a first portion of a data field that corresponds to the second communication protocol.

11. The apparatus of claim 6, further comprising:
a plurality of antennas coupled to the network interface device.

12. A method, comprising:
generating, at a communication device, a physical layer (PHY) data unit that conforms to a first communication protocol, including:
generating a first orthogonal frequency division multiplexing (OFDM) symbol that corresponds to a legacy signal field of a PHY preamble of the PHY data unit, wherein the legacy signal field includes a signal field bit sequence,
generating a second OFDM symbol that corresponds to a repetition of the legacy signal field to indicate to other communication devices that the PHY data unit conforms to the first communication protocol, including
scrambling the signal field bit sequence with a scrambling bit sequence to obtain a scrambled bit sequence, and
generating the second OFDM symbol based on the scrambled bit sequence;
wherein generating the PHY data unit further includes:
generating a third OFDM symbol that corresponds to a non-legacy signal field of the PHY preamble; and
wherein the method further includes: transmitting, by the communication device, the PHY data unit.

13. The method of claim 12, wherein:
scrambling the signal field bit sequence comprises selecting the scrambling bit sequence from a plurality of scrambling bit sequences; and
the plurality of scrambling bit sequences corresponds to a respective plurality of communication protocols that includes at least the first communication protocol and a second communication protocol.

14. The method of claim 12, wherein the scrambling bit sequence corresponds to a maximized minimal Hamming distance between i) valid candidate bit sequences for the legacy signal field that correspond to the first communication protocol, and ii) valid candidate bit sequences for a first portion of a data field that corresponds to a second communication protocol.

15. The method of claim 12, wherein the scrambling bit sequence corresponds to a maximized minimal Hamming distance between i) a subset of bits of valid candidate bit sequences for the legacy signal field that correspond to the first communication protocol, and ii) a corresponding subset of bits of valid candidate bit sequences for a first portion of a data field that corresponds to a second communication protocol.

16. An apparatus, comprising:
a network interface device associated with a communication device, wherein the network interface device includes one or more integrated circuits (ICs) configured to:
generate a physical layer (PHY) data unit that conforms to a first communication protocol, including:
generating a first orthogonal frequency division multiplexing (OFDM) symbol that corresponds to a legacy signal field of a PHY preamble of the PHY data unit, wherein the legacy signal field includes a signal field bit sequence,
generating a second OFDM symbol that corresponds to a repetition of the legacy signal field to indicate to other communication devices that the PHY data unit conforms to the first communication protocol, including
scrambling the signal field bit sequence with a scrambling bit sequence to obtain a scrambled bit sequence, and
generating the second OFDM symbol based on the scrambled bit sequence;
wherein generating the PHY data unit further includes:
generating a third OFDM symbol that corresponds to a non-legacy signal field of the PHY preamble; and
wherein the one or more ICs are further configured to transmit the PHY data unit.

17. The apparatus of claim 16, wherein:
scrambling the signal field bit sequence comprises selecting the scrambling bit sequence from a plurality of scrambling bit sequences; and
the plurality of scrambling bit sequences corresponds to a respective plurality of communication protocols that includes at least the first communication protocol and a second communication protocol.

18. The apparatus of claim 16, wherein the scrambling bit sequence corresponds to a maximized minimal Hamming distance between i) valid candidate bit sequences for the legacy signal field that correspond to the first communication protocol, and ii) valid candidate bit sequences for a first portion of a data field that corresponds to a second communication protocol.

19. The apparatus of claim 16, wherein the scrambling bit sequence corresponds to a maximized minimal Hamming distance between i) a subset of bits of valid candidate bit sequences for the legacy signal field that correspond to the first communication protocol, and ii) a corresponding subset of bits of valid candidate bit sequences for a first portion of a data field that corresponds to a second communication protocol.

20. The apparatus of claim 16, further comprising:
a plurality of antennas coupled to the network interface device.

* * * * *